Aug. 12, 1969
JAMES E. WEBB
ADMINISTRATOR OF THE NATIONAL AERONAUTICS
AND SPACE ADMINISTRATION
TENSILE STRENGTH TESTING DEVICE
Filed Dec. 27, 1966
3,460,379
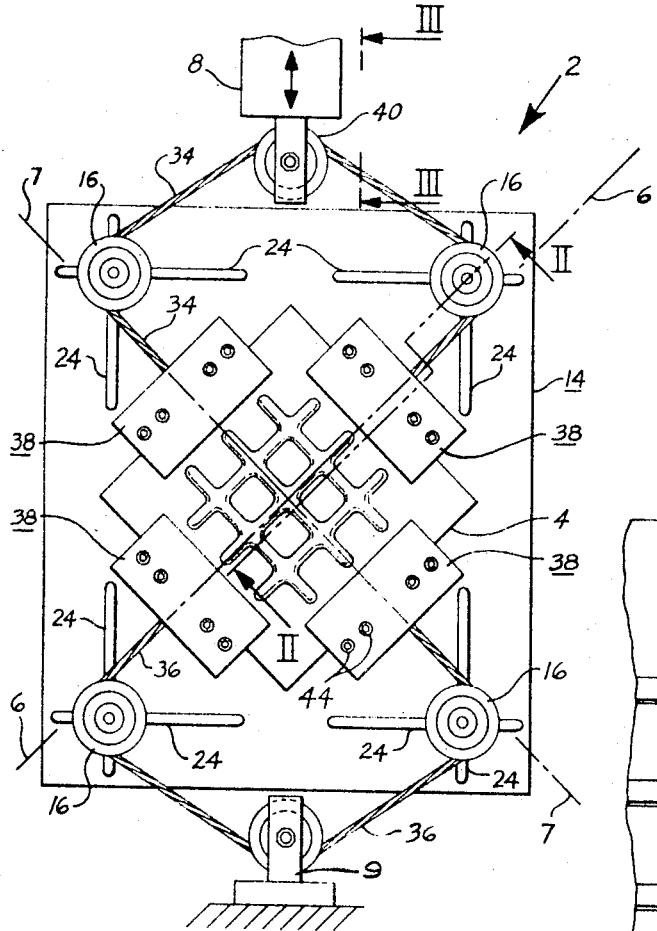
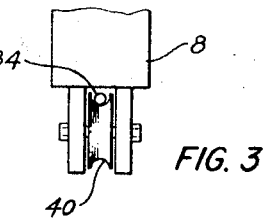
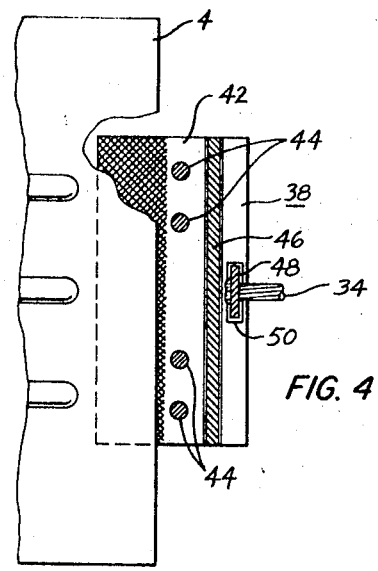
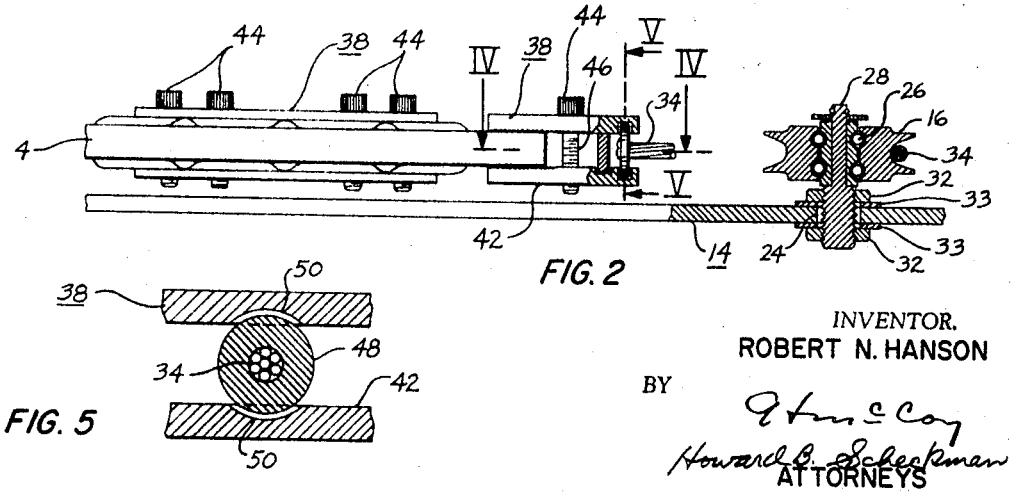
INVENTOR.
ROBERT N. HANSON
BY
ATTORNEYS

United States Patent Office

3,460,379
Patented Aug. 12, 1969

3,460,379
TENSILE STRENGTH TESTING DEVICE
James E. Webb, Administrator of the National Aeronautics and Space Administration, with respect to an invention of Robert N. Hanson, Covina, Calif.
Filed Dec. 27, 1966, Ser. No. 605,096
Int. Cl. G01n 3/28, 3/08
U.S. Cl. 73—95                                    7 Claims

ABSTRACT OF THE DISCLOSURE

This is a testing device that is usable with a conventional uniaxial force tensile testing machine. It converts the tensile testing machine from one that produces a uniaxial force to one that exerts many forces on a test specimen from various selected directions. The testing device includes flexible members that interconnect the rams of the tensile testing machine and the test specimen, and a fixture carrying a number of guides. The guides position the flexible members in the direction it is desired to apply the forces on the test specimen. Moving the rams of the tensile testing machine apart causes the flexible members to exert forces in the desired directions on the test specimen.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to testing devices, and more particularly to a testing device that will exert forces on an object from a number of directions so as to more realistically duplicate conditions the object will encounter in actual use.

Normally, many objects are tested in tension by a conventional tensile testing machine. This type of machine consists generally of two oppositely facing, spaced rams that carry jaws. The object to be tested in tension is usually made in the form of a rod or bar. Each end of the bar is gripped by a jaw, and the rams are then separated to place the object under tension. This provides an indication of various characteristics of the object, such as yield strength, or ultimate strength. It will be noted that in this type of testing the object is subjected to a single uniaxial force.

One of the problems in this type of testing is that it is not completely realistic. While these tests are very valuable, it is noted that few objects are subjected only to uniaxial tension. Usually an object is exposed to a number of forces from various directions.

In line with the above, it would be a distinct advantage to be able to more realistically test an object by subjecting it to forces from more than one direction. This would provide a more accurate indication of how it would perform in actual use.

To amplify the above, it would be very useful to be able to subject a material to conditions that would approximate the forces encountered in the vessel. This would permit a more efficient design to be developed without going through the expense of building a pressure vessel and performing an actual pressure test. It would also be desirable to learn how a flexible material, such as rubber, would perform when stretched by forces from a number of directions.

In order to test an object before this invention, it would have been expensive and complicated to construct a device, or devices, to apply forces in various directions on the object. This invention, however, teaches how to construct a simple testing device that permits a conventional tensile testing machine to be used to obtain various force patterns for testing an object.

Briefly, the testing device of this invenion includes a fixture, and a plurality of guides in the form of pulleys supported by the fixture. The fixture is positioned between the rams of the uniaxial tensile testing machine. The test specimen is positioned between the pulleys. A flexible member, such as a cable, is connected to the ram of the testing machine. It is also connected by a clamp to the portion of the specimen where it is desired to apply the force. The pulleys act as guides for the cables, being so positioned that they will essentially bend the cable so it will apply a force in the desired direction on the test specimen.

When the tensile testing machines' rams are moved apart, they will apply tension on the cables and this will be transmitted to the test specimen. The entire testing device is very simple, comprising generally the simple fixture, pulleys, cables, and clamps. These are easily fabricated.

In line with the above, it is an object of this invention to provide a testing device that can apply forces from various directions on a test specimen.

Another object of this invention is to provide a simple mechanical structure that can be used in a conventional uniaxial force tensile testing machine to provide various force patterns on a test specimen.

Another object of this invention is to provide a testing device that is simple in construction, contains few moving parts, and can be easily modified for various test programs.

Other objects and advantages will appear from the specifications and claims taken in connection with the drawings wherein:

FIG. 1 is a view of an embodiment of an invention showing how the testing device can be used in a conventional tensile testing machine;

FIG. 2 is a sectional view of FIG. 1 taken in the direction of arrows II—II showing a section of the testing device's fixture, clamp, and pulley;

FIG. 3 is a sectional view of FIG. 1 taken in the direction of III—III showing a portion of the tensile testing machine's ram;

FIG. 4 is a sectional view of a portion of FIG. 2 taken in the direction of arrows IV—IV showing a jaw of the clamp, and the cable connection, and FIG. 5 is a sectional view of FIG. 4 taken in the direction of arrows V—V showing a detail of the cable washer and clamp jaws.

Referring to FIG. 1, the testing device of the invention is indicated generally by arrow 2. The testing device will be described as it would be used to produce biaxial forces in a relatively rectangular test specimen 4. Such a test is useful to approximate conditions that an object will encounter when used as a wall of a pressure vessel.

To produce a biaxial force pattern on test specimen 4, it is necessary to apply the forces on test specimen 4, along axes 6, 7 so the forces are at right angles to each other.

Testing device 2 is set up between rams 8 and 9 of a conventional uniaxial tensile testing machine. Only the rams are shown since tensile testing machines are well known in the art. Generally, the tensile testing machine's upper ram 8 and lower ram 9 are vertically movable relative to one another. While both will be referred to as "rams" for convenience, generally only one is actually made movable.

Referring to FIG. 1, the testing device includes a flat, plate-like fixture 14 positioned between rams 8 and 9. Fixture 14 carries a plurality of guide means in the form of four pulleys 16, one positioned in each corner portion of fixture 14. Fixture 14 may also be provided with various individual grooves or openings 24 to permit each pulley 16 to be adjustably positioned.

Referring to FIG. 2, there is shown a cross-section of pulley 16 and fixtures 14. Each pulley 16 includes a roller ball bearing portion 26 that is carried on shaft 28. Shaft 28 is threaded at one end and extends through opening 24 in fixture 14. Fastening means in the form of a nut 32 and washer 33, provided on each side of fixture 14, may be used to secure each pulley in adjusted position.

Flexible force means, including cables 34, 36, and clamp means 38, are provided to transmit the force of rams 8 and 9 to test specimen 4. Referring to FIGS. 1 and 3, the cable's center portion passes over pulley 40 that is rotatably mounted in the bifurcated end of each ram 8 (9). The free end of each cable then passes over a guide pulley 16 on the fixture and is connected to the adjacent clamp means 38.

An advantage in using a single cable is that it balances the forces on both of its ends. If one cable was used for each clamp means 38, it can be seen there might be a problem in equalizing the forces on the test specimen due to slight differences in cable length that would occur.

As shown in FIGS. 1 and 2, there are four clamp means 38. Each clamp means 38 is connected to an end of test specimen 4 on either axis 7 or 8. Clamp means 38 has spaced plate-like serrated jaws 42, 42 that engage opposite surfaces of specimen 4. Each clamp means contains a plurality of bolts 44 and a spacer member 46 positioned between the jaws. When bolts 44 are tightened, it causes the jaws to rock about spacer member 46 and move into gripping engagement with the surfaces of the test specimen.

The end of each cable is connected to clamp means 38 by washer member 48. The washer member is welded to the cable's end. As shown in FIG. 5, washer member 48 is received in an over-size groove 50 provided in each jaw 42. Groove 50 permits the washer to be held by each jaw, while permitting the jaws to pivot up or down about spacer member 46.

OPERATION

Assume that each pulley 16 has been fixed in selected position in its groove 24 in fixture 14. Pulleys 16 are arranged on fixture 14 so the forces applied by cables 34, 36 will be applied from the desired direction to test specimen 4.

As shown in FIG. 1, each clamp means 38 is clamped by bolts 44 to an end of test specimen 4. Cable 34 will be connected by the clamp means to the upper adjacent sides of test specimen 4, while cable 36 will be connected to its lower adjacent sides. It will be noted that test specimen 4 is not connected to fixture 14. It is supported in position by clamp means 38, each pulley 16 and cables 34 and 36. It is not restrained from movement by fixture 14.

In the embodiment described in FIG. 1, cables 34 and 36 are guided by pulleys 16 so the forces applied by the cables are coincident with the testing axes 7 and 8 of the test specimen. That is, each pulley 16 is positioned so a line drawn from the center of test specimen 4 will be tangent to the outer surface of each pulley, and so lines drawn through the adjacent ends of one cable will be perpendicular to each other.

To place test specimen 4 under load, it is only necessary to relatively separate rams 8 and 9. This in turn applies a force to the test specimen equal to the tension force in cables 34 and 36 that are connected to the various portions of test specimen 4.

The applied force can be calculated from the tensile testing machine's readings. Additionally, if desired, deflection can be measured with strain gauges, dial indicators or extensometers. The measurements taken would depend upon the test specimen, and parameters it is desired to monitor, as, for example, ultimate strength, yield strength, or elongation.

While only a relatively simple force pattern is shown and described, it will be apparent to those skilled in the art that various force patterns can be devised by positioning any selected number of pulleys, and cables, in various positions to provide selected forces in either tension or compression on the test specimen.

It is noted that the test device is simple in construction, contains few moving parts, and enables a conventional uniaxial tensile testing machine to be used to provide forces on a test specimen from a number of directions.

What is claimed is:

1. In a testing device for applying forces from more than one direction on a test specimen, said testing device being adapted for use in a tensile testing machine that has relatively movable opposed rams that apply a uniaxial force to a test specimen, the combination comprising:

individual flexible means for connecting each of said rams to spaced locations on opposite sides of said test specimen which are diagonally opposite to one another so as to apply tensile forces to said test specimen when said rams are relatively separated;
   a fixture; and
   guide means adjustably carried by said fixture to position each of said flexible means so that it will exert a force from a desired direction on said test specimen as determined by the placement of said guide means.

2. A testing device, as set forth in claim 1, wherein said flexible means includes a plurality of cables, and each cable has its center portion adapted to be connected to a ram and its ends to be connected to said test specimen.

3. A testing device, as set forth in claim 2, wherein said guide means are a plurality of pulleys that can be adjustably positioned in selected positions on said fixture so as to rotatably guide said cables as they exert the forces from the selected directions.

4. In a testing device for converting a uniaxial force tensile testing machine, having opposed rams for exerting a uniaxial force on a test specimen into a multiple force tensile testing machine, the combination comprising:

a cable for each ram, each cable having its center portion adapted to be connected to its ram and its cable ends connected to said test specimen;
   a fixture adapted to be positioned between said rams;
   a plurality of pulleys carried by said fixture, said pulleys positioning said cable ends so they are tangent to said pulley's outer surface and directed toward the center of said test specimen; and
   clamp means to connect the end of each cable to said test specimen.

5. In a testing device, for converting a tensile testing machine having opposed rams for exerting a uniaxial force into a machine for applying a biaxial force on a relatively rectangular test specimen, the combination comprising:

a relatively flat fixture adapted to be positioned between said rams;
   a pair of cables, each cable having its center portion adapted to be movably connected to one of said rams and its ends connected to adjacent ends of said rectangular test specimen;
   a plurality of pulleys adjustably carried by said fixture, said pulleys positioning said cable ends so they are tangent to said pulley's outer surface and directed toward the center of said test specimen, and also at right angles to each other; and
   clamp means to connect the end of each cable to said test specimen.

6. A testing device, as set forth in claim 5, wherein said fixture is provided with a plurality of grooves and a pulley is adjustably carried within a groove.

7. In a testing device, for converting a uniaxial force tensile testing machine having opposed rams for exerting a uniaxial force into a machine for applying a biaxial force on a relatively rectangular test specimen, the combination comprising:
- a cable for each ram, each cable having its center portion movably connected to its ram and its cable ends connected to adjacent sides of said test specimen;
- a relatively flat, rectangular fixture adapted to be positioned between said rams;
- four pulleys carried by said fixture, each pulley acting as an individual guide for the end of each cable, each of said pulleys being positioned in a corner portion of said fixture so their cable will be tangent to said pulley's outer surface and directed toward the center of said test specimen, and with the end of each cable at right angles to its other end; and
- clamp means to connect the ends of each cable to the ends of said test specimen.

References Cited
UNITED STATES PATENTS

| | | | |
|---|---|---|---|
| 1,326,505 | 12/1919 | Hull | 38—102.5 |
| 1,343,611 | 6/1920 | Berger | 73—95 X |
| 1,726,254 | 8/1929 | Allen et al. | 69—19.3 |

CHARLES A. RUEHL, Primary Examiner

U.S. Cl. X.R.

73—159